United States Patent [19]
Grove

[11] Patent Number: 4,947,886
[45] Date of Patent: Aug. 14, 1990

[54] TEMPERATURE ACTUATED FLOW CONTROL DEVICE

[75] Inventor: Lee A. Grove, Elkhart, Ind.

[73] Assignee: Remote Controls, Inc., Mishawaka, Ind.

[21] Appl. No.: 427,255

[22] Filed: Oct. 25, 1989

Related U.S. Application Data

[63] Continuation-in-part of Ser. No. 341,474, Apr. 21, 1989, Pat. No. 4,884,595.

[51] Int. Cl.$^5$ .................. F16K 11/18; F16K 31/64; F16L 55/14
[52] U.S. Cl. .................................. 137/72; 137/80; 137/636.1; 169/19; 169/57; 239/569; 251/4; 251/5; 251/9; 251/67; 251/74; 251/90; 251/263
[58] Field of Search ............ 137/72, 75, 79.5, 79, 137/80, 636, 636.1; 251/4, 5, 6, 7, 8, 9, 10, 61.1, 89, 90, 251, 263, 67, 74, 75; 604/250; 239/569; 236/DIG. 5; 169/19, 20, 26, 57

[56] References Cited

U.S. PATENT DOCUMENTS

| | | | |
|---|---|---|---|
| 114,981 | 5/1871 | Shoenberger | 251/4 |
| 2,008,961 | 7/1935 | Lessard | 137/72 |
| 3,016,915 | 1/1962 | Moeller, Jr. | 137/636.1 |
| 3,075,551 | 1/1963 | Smith et al. | 251/7 |
| 3,108,434 | 10/1963 | Morley et al. | 137/72 |
| 3,223,116 | 12/1965 | Criddle | 251/5 |
| 4,270,849 | 6/1981 | Kalbfleisch | 137/75 |
| 4,275,754 | 6/1981 | Lyons et al. | 137/75 |
| 4,328,834 | 5/1982 | Oates, Sr. et al. | 137/636.1 |
| 4,533,114 | 8/1985 | Cory et al. | 137/75 |
| 4,619,434 | 10/1986 | Snyder et al. | 137/72 |

*Primary Examiner*—George L. Walton
*Attorney, Agent, or Firm*—Barnes & Thornburg

[57] ABSTRACT

A flow control device, such as a valve, has a body with two portions which define two valve chambers, an inlet, which is coupled to a source of pressurized fluid and which opens into one of the valve chambers, and an outlet coupled to downstream devices, such as sprinkler heads, and which opens into the other valve chamber. A piece of collapsible tubing couples the two valve chambers. A shaft extends into the valve and is provided with a mechanism for pinching the collapsible tubing shut which causes the collapsible tubing to collapse due to the pressure exerted on its exterior by the pressurized fluid surrounding it. A coil spring is attached to the shaft and the valve body. When the valve is closed, i.e., the collapsible tubing collapsed, the coil spring is biased to cause the shaft to rotate if released. The shaft is prevented from rotating by a fusible link. When the temperature to which the valve is exposed reaches or exceeds a predetermined temperature, the fusible link melts. This releases the shaft for rotation and the coil spring rotates the shaft which unpinches the collapsible tubing. This permits the collapsible tubing to uncollapse, thus opening the valve.

27 Claims, 5 Drawing Sheets

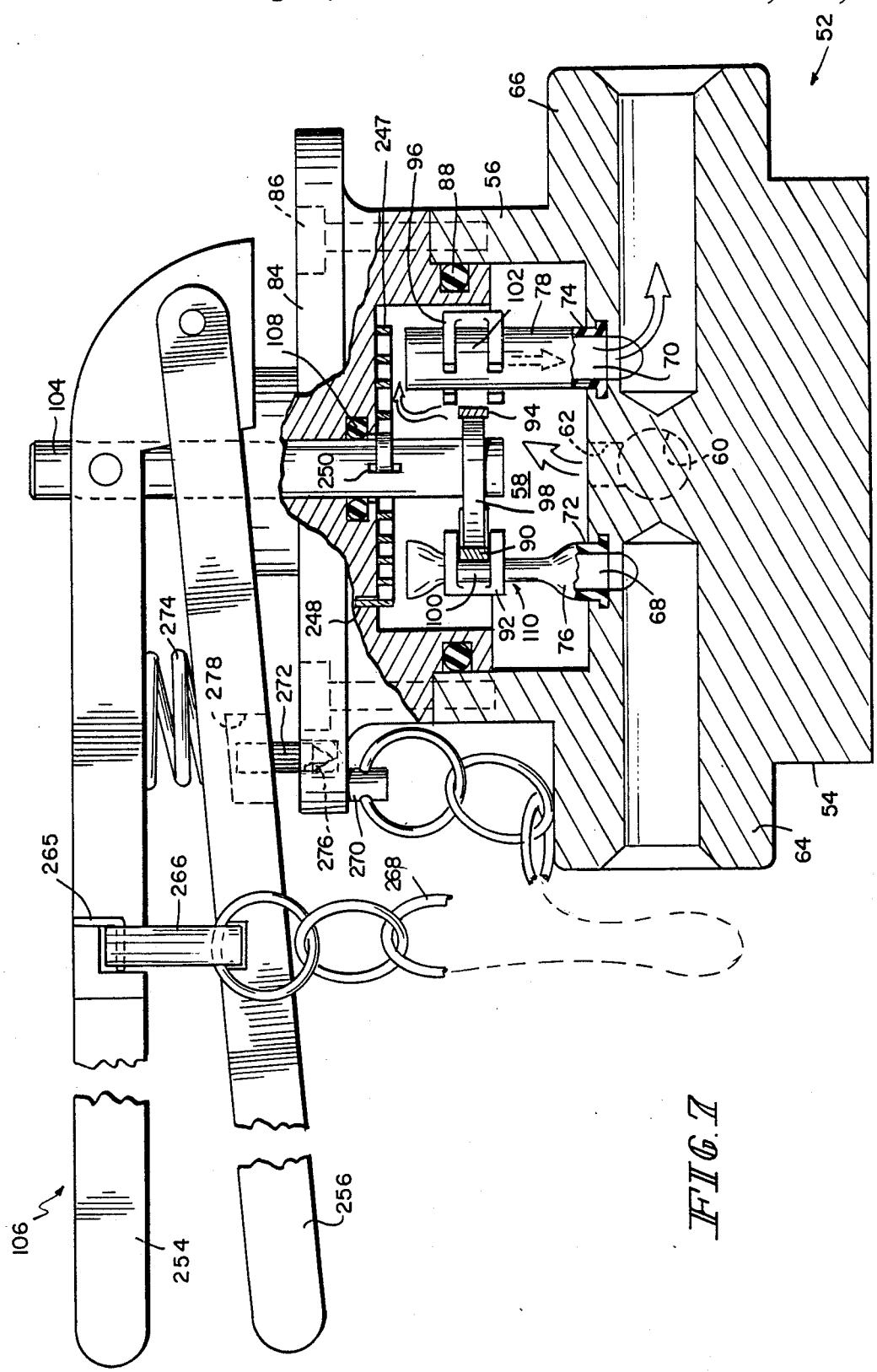

TEMPERATURE ACTUATED FLOW CONTROL DEVICE

This is a continuation-in-part of U.S. Ser. No. 341,474 for a Flow Control Device filed Apr. 21, 1989 now U.S. Pat. No. 4,884,595.

BACKGROUND AND SUMMARY OF THE INVENTION

The present invention relates generally to flow control devices, and more particularly to devices, such as valves, which are well-suited for controlling the flow of liquids, gases, slurries, suspensions, mixtures and other fluid or fluidized streams, collectively referred to below as "fluids" or "media." Devices constructed in accordance with the present invention are especially well-suited for controlling the flow of a fluid or medium which is contaminated with, or which includes by design, sand, sediments, and/or other solid particulate matter having abrasive properties.

A variety of valves suitable for controlling the flow of liquid and gaseous fluids are available. Such valves typically incorporate sealing surfaces or elements which may include diaphragms, O-rings, pistons, disks or specially machined tapered seats. The ability of such devices to function properly when exposed to sediment, sand, dirt, metal chips or other particles in the fluid flow varies with specific design parameters and operating conditions, but in general is not good. Such contaminants tend to clog, score, or otherwise damage sealing surfaces in the valves, leading to degradations in performance, or outright failures, of the valves.

One particular application for valves in which the above problems have been identified relates to large, ocean going vessels, and particularly to navel warships. Warships are typically provided with sprinkler systems which are intended to dowse fires in or around the ship's magazine, fuel supply, and other installations. Such ships may also be provided with wash-down systems which are used in decontaminating surfaces which have been exposed to chemical clouds, radioactive fallout, or other hazards. Water to supply such systems is generally drawn from the sea through one or more large water inlets located below the water line of the ship. Sea water may also be drawn in through these or other inlets to provide water for use in maintenance, cooling and other applications where clean, fresh water is not required. Although these inlets may be provided with strainers to keep out seaweed and other large objects, sand, sediments, and other smaller contaminants are often drawn into these systems. This is particularly true when the ship is required to sail or dock in relatively shallow waters or harbors.

Accordingly, a need exists for valves which can control the flow of media which may be contaminated with sand, sediments, or other solid particulate matter. It is an object of the present invention to provide such valves.

Another object of the present invention is to provide a flow control device which is relatively simple and inexpensive to manufacture and maintain, and which is very reliable in operation.

Yet another object of the present invention is to provide a flow control device which is suitable for use in a fire control system, and which is provided with a feature which allows the device to automatically open or operate when the temperature of the device increases beyond a predetermined temperature value.

These and other objects of the present invention are attained in a flow control device which comprises a body having side walls which define a fluid holding chamber, at least one inlet opening into the chamber, at least one outlet opening into the chamber and having an outlet opening in the valve body, collapsible tubing means sealingly attached to the outlet opening and extending into the chamber, and means for selectively collapsing and uncollapsing the tubing means to block and unblock the flow of fluid from the chamber through the outlet opening. The means for collapsing the tubing means preferably comprises a mechanical device disposed adjacent the tubing means at a first location spaced apart from the side walls of the chamber. The fluid or media flow enters the chamber under a positive pressure. When the mechanical device collapses the tubing at the first location, the pressure of the surrounding fluid in the chamber exerts a collapsing force on that portion of an outer surface of the tubing means between the mechanical device and the side wall of the chamber, causing that portion of the tubing means to collapse. The mechanical device may comprise a camming device and an operator for the camming device, such as a handle and a shaft which extends through the side wall of the chamber. In one embodiment, the valve includes at least two outlets, each having collapsible tubing means attached thereto. In this embodiment, both tubing means are commonly collapsed by operation of a single camming device.

One embodiment of the mechanical device further includes a pair of closure members oppositely disposed on either side of the tubing means. At least one of the members is movably mounted and situated adjacent a camming surface of the camming device. The movable members cooperate with the camming device to collapse the tubing means when the camming device is operated.

One means for uncollapsing the tubing means comprises pressure exerted by the fluid or media on an inner surface of the tubing means. When the mechanical device is moved to a position which does not collapse the tubing means at the first location, the pressure of the fluid or media in the chamber causes the tubing means to return to an uncollapsed (open) condition. The tubing means may be formed from a natural or synthetic rubber, or a functionally equivalent material, having a durometer hardness rating which is selected on the basis of at least one characteristic (such as specific gravity, viscosity, etc.) of a fluid flow controlled by the device. In one embodiment, the hardness rating is selected for the sizes and types of particulate matter expected in the fluid flow. In one application involving a sand and sediment contaminated flow of water, tubing formed of a synthetic rubber, marketed under the name VITON and having a durometer hardness rating in the range of 60-90 was found acceptable. Proper selection of the material and hardness rating assures that the tubing means will adequately surround and encapsulate particles which may be carried by particular media flows, and that an undue amount of force or pressure will not be required to collapse the tubing.

Devices which utilize the present invention may further comprise means responsive to an increase in temperature for automatically returning the tubing means to an uncollapsed state to allow fluid to flow from the chamber through the outlet means when the temperature of the device increases beyond a predetermined value. The means responsive to an increase in temperature may incorporate a metal (or other material) having a relatively low melting point which corresponds to the selected predetermined value. In one embodiment of the invention, the means for selectively collapsing the tubing means includes a movably mounted member disposed adjacent the tubing means, biasing means for urging the member against the tubing means to collapse the tubing and block the flow of fluid from the chamber, and means for selectively moving the member against the biasing means and away from the tubing means to allow the tube to return to an uncollapsed state so that fluid may flow from the chamber through the outlet means. In this embodiment, the low melting point metal forms a supporting base for the biasing means (e.g., a coil spring) such that when the temperature of the device increases beyond the predetermined value, the supporting base for the biasing means melts and the biasing means sinks into the base and ceases to urge the member against the tubing means. This allows the tubing to return to the uncollapsed state so that fluid may flow from the chamber through the associated outlet.

In another embodiment of the invention, an improved means for automatically opening the valve when it is exposed to a temperature which reaches or exceeds a predetermined temperature is provided. The valve has two portions which define two valve chambers. An inlet, which is coupled to a source of pressurized fluid, opens into one of the valve chambers and an outlet coupled to downstream devices opens into the other valve chamber. A piece of collapsible tubing couples the two valve chambers. A shaft extends into the valve and is provided with a mechanism for pinching the collapsible tubing shut which causes the collapsible tubing to collapse due to the pressure exerted on its exterior by the pressurized fluid surrounding it. A coil spring is attached to the shaft and the valve body. When the valve is closed, i.e., the collapsible tubing collapsed, the coil spring is biased to cause the shaft to rotate if released. The shaft is prevented from rotating by a fusible link. When the temperature reaches or exceeds a predetermined temperature, the fusible link melts. This releases the shaft and the coil spring rotates the shaft which permits the collapsible tubing to uncollapse, thus opening the valve.

Other objects, advantages and novel features of the present invention will become apparent from the following detailed description of the invention when considered in conjunction with the accompanying drawings.

BRIEF DESCRIPTION OF THE DRAWINGS

FIG. 7 is a side perspective view, partially broken away, of the embodiment of the valve of FIG. 3 modified to incorporate the improved automatic opening means of the embodiment of FIG. 6.

DETAILED DESCRIPTION OF THE DRAWINGS

Figure 1:
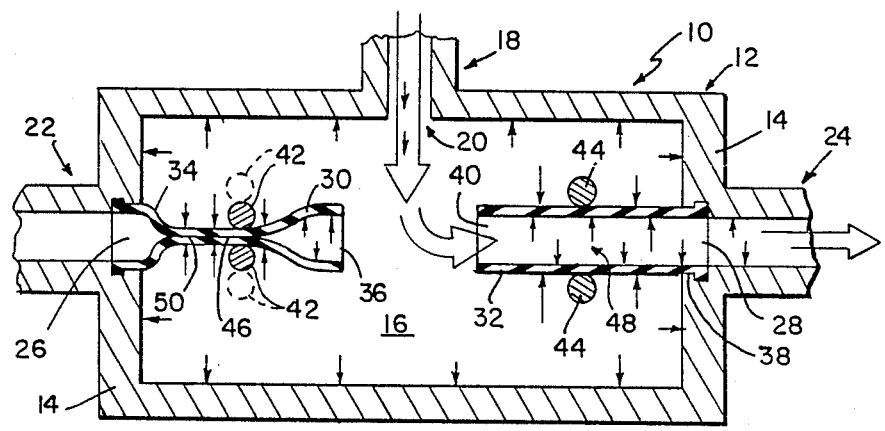
FIG. 1 shows a schematic representation of a valve constructed in accordance with the present invention.

FIG. 1 shows a schematic representation of a valve 10 constructed in accordance with the present invention. Valve 10 includes a valve body 12 which has side walls 14 which define a fluid holding chamber 16 which receives a flow of pressurized fluid from an inlet 18. Inlet 18 is adapted for connecting valve 10 to an upstream source of pressurized fluid (not shown) and, thus, is preferably provided with threads or other appropriate means for connecting to a nipple, union, or other appropriate hardware. Inlet 18 has a downstream end 20 which opens into chamber 16 to complete the connection between the upstream source of pressurized fluid and fluid holding chamber 16.

The embodiment of valve 10 illustrated in FIG. 1 is further provided with outlets 22 and 24 which, for purposes of illustration only, are shown on opposite sides of valve body 12. As with inlet 18, outlets 22 and 24 are provided with nipples, unions, or other appropriate hardware (not shown) to facilitate connection to a downstream device. Outlets 22 and 24 may be connected to a variety of downstream devices, including sprinkler heads, plumbing fixtures, wash-down hoses, or other manually or automatically operated valves. Valve 10 may also be used as a pilot control valve, in which case outlets 22 and 24 may be connected to the pilot or control inputs of other valves or similar devices.

Outlets 22 and 24 include respective outlet openings 26 and 28 in side walls 14. Sealingly attached or connected to these outlet openings are lengths of collapsible tubing 30 and 32. Specifically, tubing 30 is connected at its first end 34 around outlet opening 26, and extends from outlet opening 26 into chamber 16. Second end 36 of tubing 30 opens into valve chamber 16 to allow for entry of pressurized fluid. Similarly, tubing 32 has a first end 38 which is sealingly connected or attached around outlet opening 28, and extends from outlet 28 into valve chamber 16. Second end 40 of tubing 32 opens into valve chamber 16 to admit the high pressure fluid, as indicated by the open arrows in FIG. 1.

The remaining components of valve 10, as illustrated in FIG. 1, are schematically illustrated mechanical devices 42 and 44 which are disposed adjacent locations 46 and 48 of tubings 30 and 32, respectively, and which are used for collapsing tubings 30 and 32 at these locations. Tubing 30 is shown in a collapsed or closed state, while tubing 32 is shown in an uncollapsed or opened state. Mechanical devices 42 and 44 may be cam operated mechanical members (as illustrated below in connection with the embodiment shown in FIGS. 2 and 3) or, alternatively, may employ any other suitable means for collapsing the tubing at locations 46 and 48, including electrical solenoids, hydraulic and/or pneumatic operators, or other appropriate mechanical devices. Tubings 30 and 32 are formed of a relatively soft synthetic or natural rubber (or functionally equivalent material) having a durometer hardness rating selected for the sizes and types of particles expected in the fluid flow. In a particular application involving a flow of water contaminated with sand and sediments, tubing formed of the synthetic rubber VITON having a durometer rating of 60-90 was found to provide acceptable results. Proper selection of tubing type and hardness assures that the tubing is relatively easy to collapse at the specified locations.

As indicated by the closed arrows in FIG. 1, an equal pressure acts on both the inner and outer surfaces of the tubing (i.e., tubing 32) in its uncollapsed state. However, when the tubing is collapsed, for example, at location 46 by device 42, the pressure inside the tube downstream of location 46 decreases. The pressure of the fluid in chamber 16 acts on the outer surface of tubing 30 between location 46 and side wall 14 to further collapse this portion of the tube. Thus, a relatively large sealing area 50 is provided by the combined action of device 42 and the pressure of the fluid in fluid chamber 16. Since the tubing durometer rating of the tubing can be chosen to assure that the tubing is relatively soft, particles of sand, sediments, or other contaminants in sealed area 50 will be enclosed and encapsulated by the tubing, enabling the valve to completely shut off the flow, notwithstanding the presence of these particles. If necessary, a bleed valve is connected in the downstream circuit (i.e., downstream of opening 26) to assure that pressure is not trapped in the downstream circuit, and that the portion of tubing 30 between location 46 and side wall 14 will be collapsed by the fluid pressure when the pressure in the downstream circuit decreases substantially below that of the fluid in chamber 16.

It should be noted that when the tubing is in the uncollapsed condition, there is equal pressure on both the inner and outer surfaces of the tube. Consequently, regardless of the pressure that is applied to the inside of chamber 16, the force required to collapse the tubing at locations 46 and 48 remains constant. This is the same force that would be required to collapse the tubing in an unpressurized environment. Since all portions of the tube are wholly contained within valve chamber 16, and the tubing is never required to contain the pressure in the chamber, the pressure rating of the tubing is not critical.

Although the valve illustrated in FIG. 1 is shown with a single inlet 18, additional inlets may be provided, if desired. Similarly, a single outlet or three or more outlets may be provided as alternatives to the two-outlet configuration shown.

Figure 2:
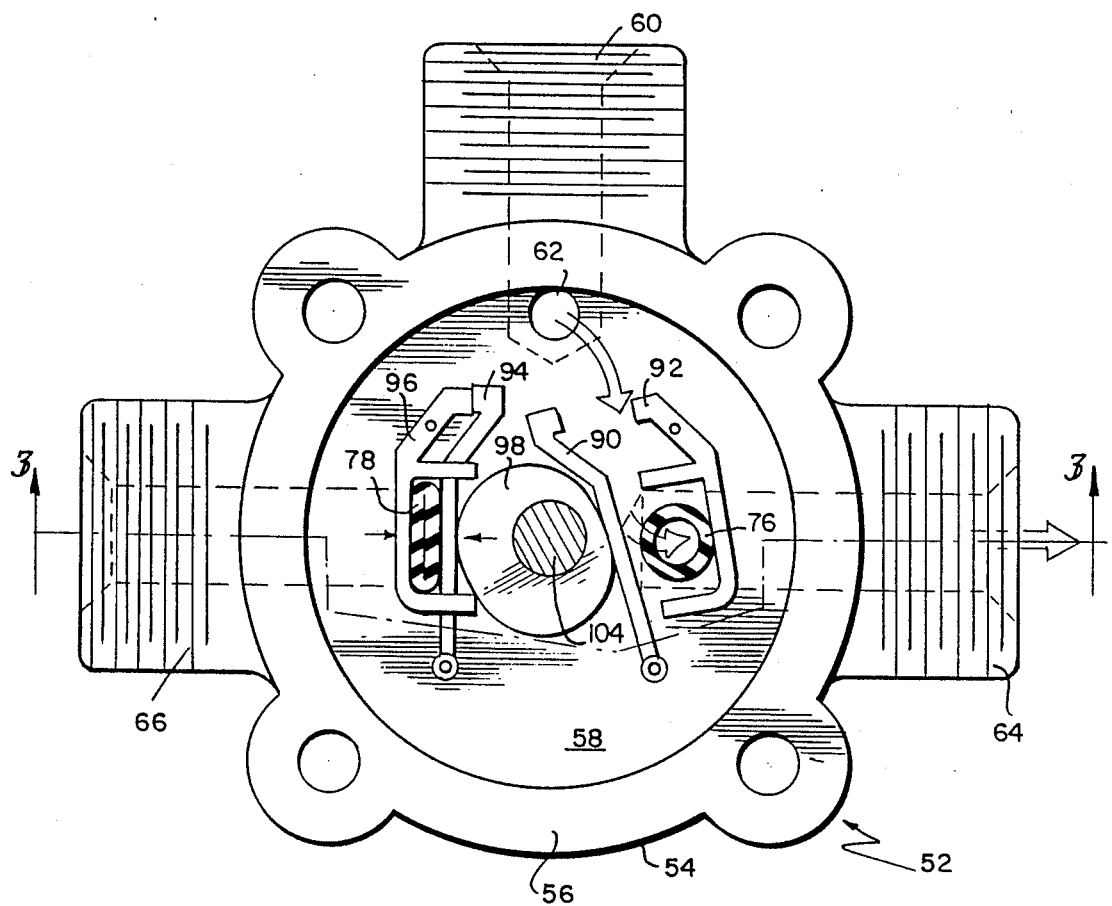
FIG. 2 shows a top view (with top cover removed) of an embodiment of a valve constructed in accordance with the present invention.
Figure 3:
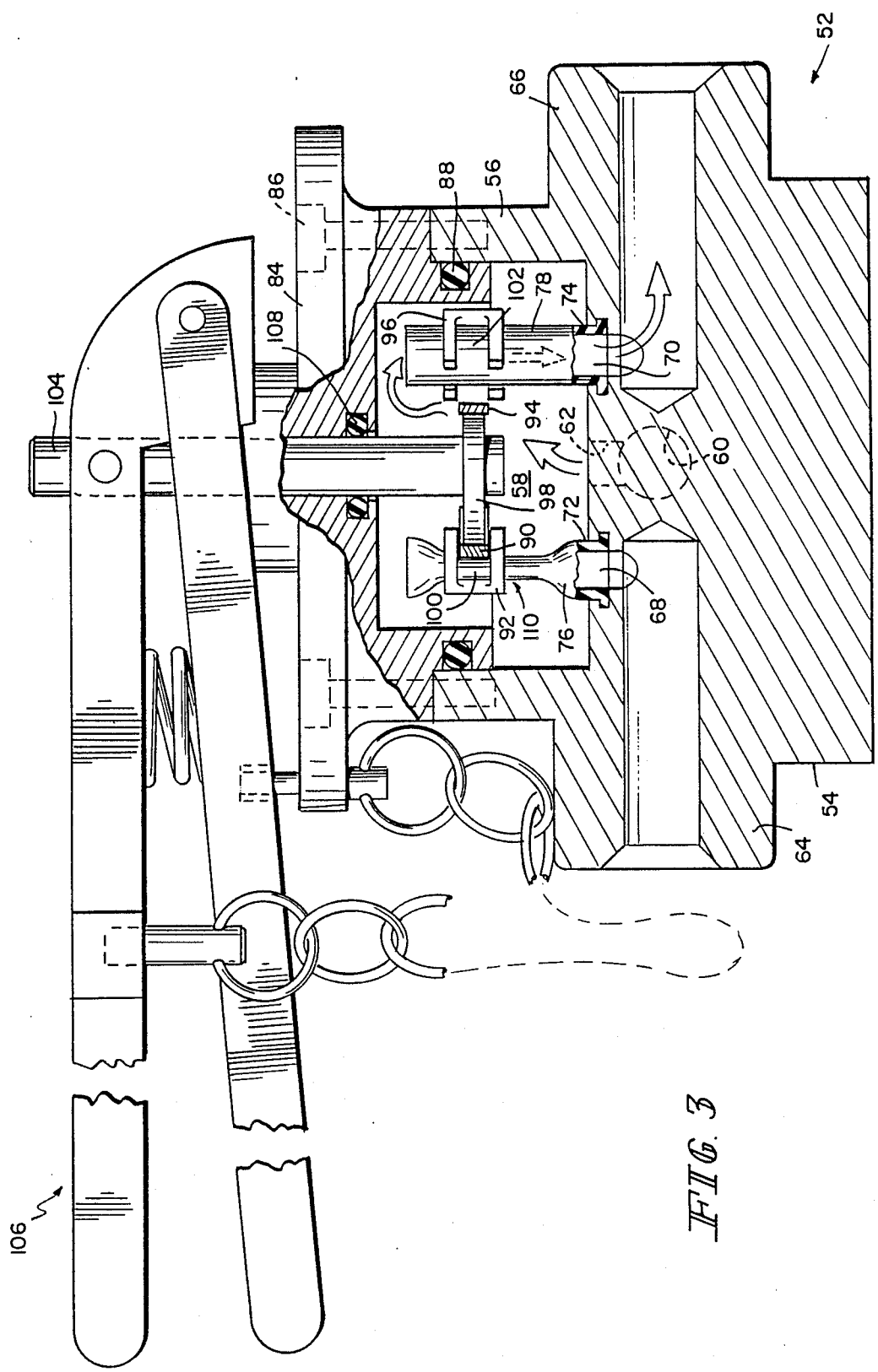
FIG. 3 shows a side view, in partial cross-section, of the embodiment of the valve of FIG. 2, taken along line 3—3 of FIG. 2.

FIG. 2 shows a top view (with top cover removed) of valve 52 which is constructed in accordance with the present invention. FIG. 3 shows a side view, in partial cross-section, of this same valve with top cover and operating handle in place. Valve 52 includes a valve body 54 having side walls 56 which define a fluid holding valve chamber 58. A single inlet 60 is provided for connecting fluid holding chamber 58 to an upstream source of pressurized fluid. Inlet 60 has a downstream end 62 which opens into chamber 58.

Valve 52 is further provided with outlets 64 and 66 which are adapted for connection to downstream devices. With reference to FIG. 3, outlets 64 and 66 have upstream ends 68 and 70 which open into chamber 58 and which are sealingly connected to first ends 72 and 74, respectively, of collapsible tubing lengths 76 and 78. Tubing lengths 76 and 78 extend from openings 68 and 70 into valve chamber 58 which is defined by side walls 56 and cover 84 of valve body 54. Cover 84 is attached to side walls 56 by bolts 86, and a seal is effected between side walls 56 and cover 84 by O-ring 88.

Referring to FIGS. 2 and 3, a pair of pivotally mounted closure members 90, 92 and 94, 96 are provided on opposing sides of tubing lengths 76 and 78, respectively. Closure members 90, 92 and 94, 96 are operated by camming device 98 to collapse tubing lengths 76 and 78 at locations 100 and 102 (FIG. 3), either individually or simultaneously (i.e., simultaneously collapsed or uncollapsed), as desired. For purposes of illustration only, tubing length 76 is shown in the collapsed state, while tubing length 78 is shown in the uncollapsed state. As illustrated in FIG. 3, cam 98 is controlled by a shaft 104 and handle 106 mechanism. Shaft 104 extends through cover 84 and is sealed appropriately by O-ring 108.

Referring again to FIG. 3, when tubing length 76 is collapsed at location 100 by the action of cam 98 and closure members 92, 90, the pressure of the fluid within chamber 58 further collapses that portion of tubing length 76 between location 100 and outlet opening 68, which portion is generally indicated by reference numeral 110. Tubing lengths 76 and 78 (and portion 110) can be as long as necessary to provide for an effective and total shut-off of the outlets by the action of cam 98 and the fluid pressure on portion 110 of the collapsible tubing. This arrangement prevents valve leakage or valve clogging, notwithstanding the presence of various types and sizes of contaminants in the fluid flow which is controlled by the valve.

Figure 4:
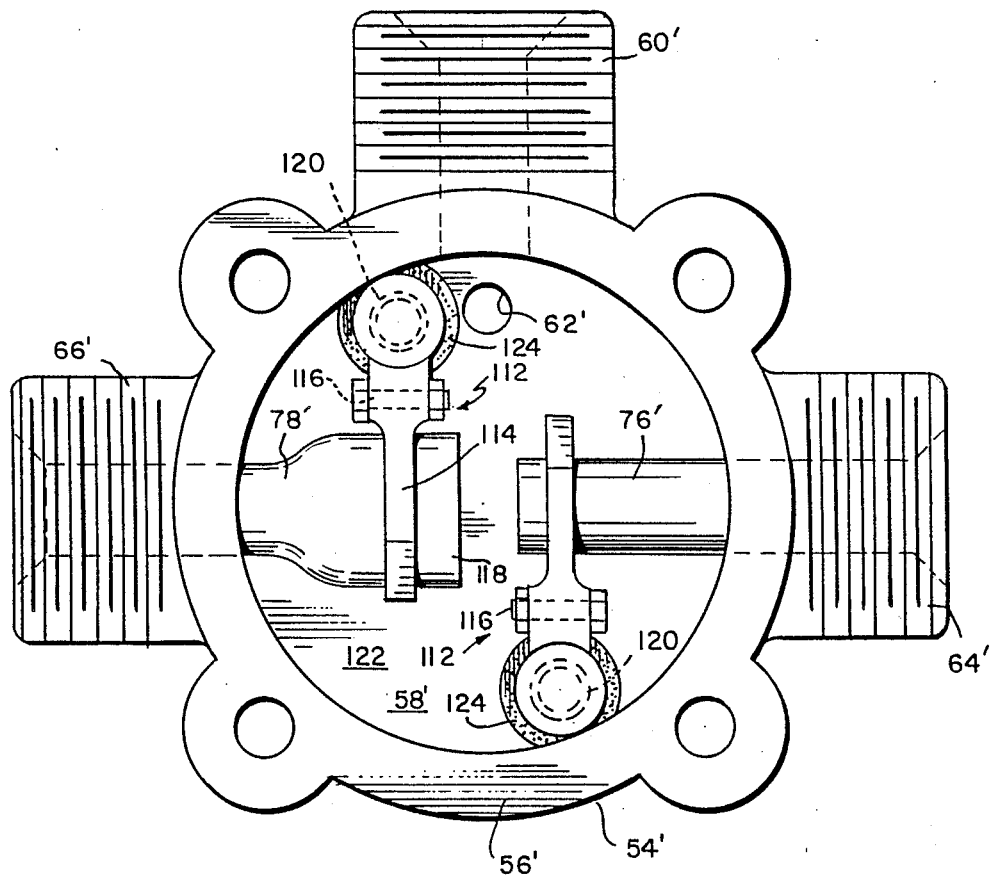
FIG. 4 shows a top view (with top cover removed) of an alternative embodiment of a valve constructed in accordance with the present invention.

FIG. 4 shows a top view of an alternative embodiment of the valve of FIGS. 2 and 3. For ease of reference, substantially identical structures in FIGS. 2 and 4 are identified by like reference numerals, with the addition of a prime designation to the numerals of FIG. 4.

Figure 5:
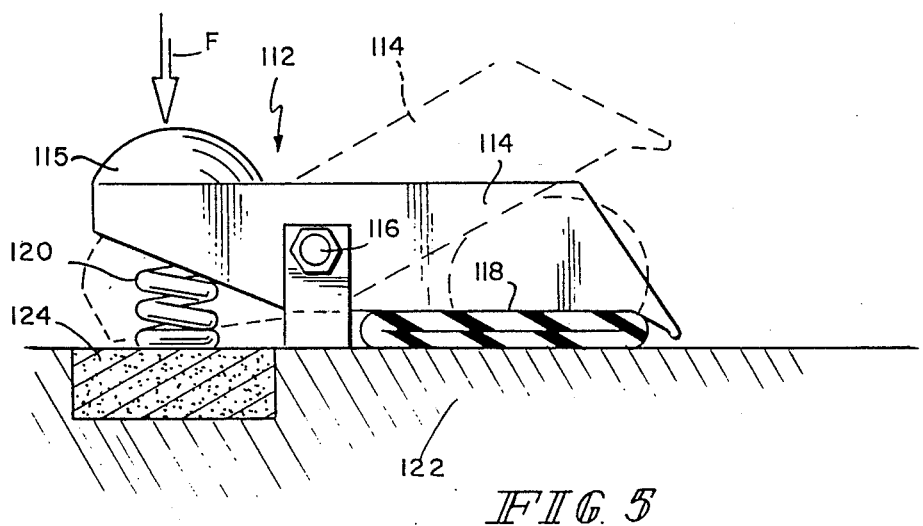
FIG. 5 shows a close-up view of a portion of the alternative embodiment shown in FIG. 4.

The primary distinctions between the embodiment of FIG. 4 and that of FIGS. 2 and 3 is the mechanism 112 used in the embodiment of FIG. 4 to collapse collapsible tubing lengths 76' and 78'. Mechanism 112 is schematically illustrated in FIG. 5. Mechanism 112 comprises an arm 114 which is pivotally mounted near its center point at 116. On one side of pivot 116, arm 114 extends over and adjacent the collapsible tubing, which is identified by reference numeral 118 in FIG. 5. On the other side of pivot 116, the other end 115 of arm 114 is biased upwardly by the action of a biasing member which, in this embodiment, comprises coil spring 120. The action of spring 120 urges arm 114 in a clockwise direction around pivot 116 which will cause the collapse of tubing 118 by squeezing the tubing between arm 114 and underlying support 122. When tubing 118 is collapsed, the associated outlet of the valve is considered "closed." To open the valve, a force F is applied as indicated to the portion of arm 114 immediately above spring 120 (i.e., end 115 of arm 114), compressing the spring and raising the portion of arm 114 which lies adjacent tubing 118. When arm 114 is raised, the pressure of the fluid within chamber 58' causes tube 118 to return to the uncollapsed state, thus opening the associated outlet of the valve.

An additional feature of the embodiment illustrated in FIGS. 4 and 5 (which may also be incorporated in other embodiments of the invention) relates to an arrangement which will allow the outlets of the valve to be opened "automatically" in the event the temperature of the valve increases beyond a selected, predetermined value. This arrangement is especially well-suited for applications in which the valve is to be used in a fire warning or fire control system. It involves the use of a block of low temperature melting point metal 124 as a supporting base for spring 120. If, for instance, the location of the valve is engulfed in flames and the valve cannot be manually, electrically, or otherwise activated, an increase in the temperature of valve body 54' will cause metal base 124 to soften and melt, allowing spring 120 to sink into base 124 causing tubing 118 to revert to the uncollapsed state.

The particular material used for base 124 can be selected so as to allow for such "automatic" operation to occur when the temperature of the valve body reaches or exceeds a predetermined value. This particular aspect of the invention is not intended to be limited to the particular configuration of components illustrated in FIG. 5, but can be incorporated into other embodiments, as well. A similar feature could, for example, be incorporated into the embodiment shown in FIGS. 2 and 3 above, or in alternative configurations. However, the arrangement shown in FIG. 5, and particularly the use of a low melting point metal to "trigger" the automatic operation of the valve, are preferred features of the invention and are thought to offer advantages over other possible designs.

It should be noted that Force F may be generated by mechanical, electrical, hydraulic, or other means.

The terms "fluid" or "fluids" and "medium" or "media" are used interchangeably in this application to refer to the material(s) (in gaseous, liquid or solid form) which constitute a flow to be controlled by a device which incorporates the present invention. Although certain aspects and embodiments of the invention are particularly well-suited for controlling a flow which is a combination of a liquid or gaseous carrier and solid particulate matter, the subject invention is not necessarily limited to this application. Similarly, although many devices which may incorporate the present invention are termed "valves," the principles of the invention may find application in other devices, as well. Accordingly, the use of such terms (i.e., fluid(s), valve(s), etc.) in either the description or claims is not intended to limit the scope of the present invention.

Figure 6:
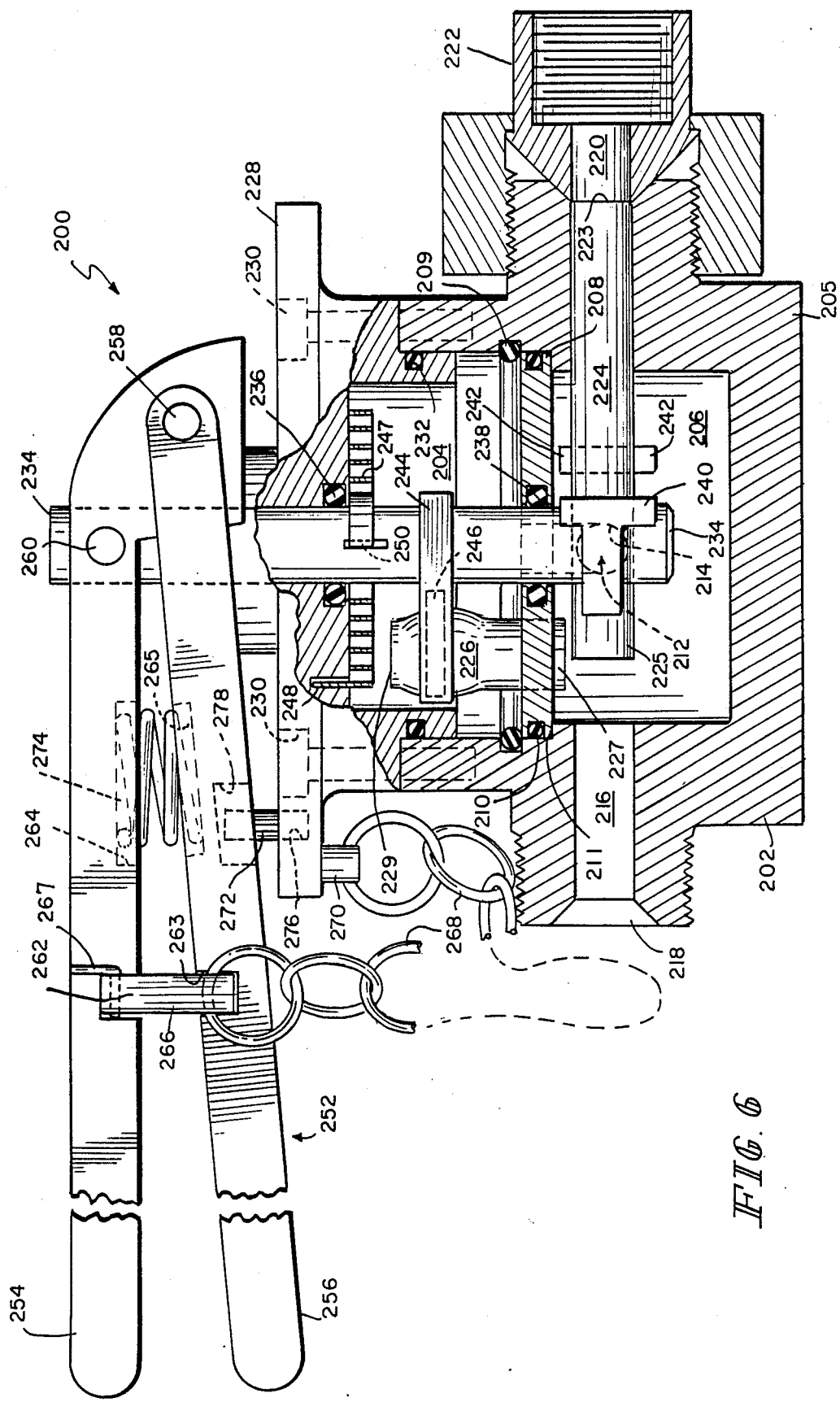
FIG. 6 is a side perspective view, partially broken away, of another embodiment of the invention which has an improved means for automatically opening the valve when the temperature to which the valve is exposed reaches or exceeds a predetermined value.

Referring to FIG. 6, another embodiment of a valve which makes use of the principles of this invention is shown. This embodiment includes an improved arrangement for opening the valve "automatically" in the event the temperature of the valve increases beyond a selected, predetermined temperature. Valve 200 has a valve body 202 and a cover 228 secured to the valve body 202. A plate 208 mounted within valve body 202 separates an upper valve chamber 204 in valve body 202 from a lower valve chamber 206 in valve body 202. A retaining ring 209 holds plate 208 in place against an annular shoulder 211 formed in an inner sidewall of valve body 202. Retaining ring 209 is illustratively a monel spring steel retaining ring. An O-ring 210 extends around the perimeter of plate 208 to seal plate 208 to the inner sidewall of valve body 202. Cover 228 is secured to valve body 202 by bolts 230. An O-ring 232 is provided to effect a seal between cover 228 and the inner sidewall of the valve body 202.

A lower portion 205 of valve body 202 has an inlet port 212 opening to an inlet passage 214 which extends upwardly into the upper valve chamber 204 and opens therein. Inlet port 212 is coupled to an upstream source of pressurized fluid (not shown).

Lower portion 205 of valve body 202 also has a first outlet port 218 which is coupled to downstream devices such as sprinkler heads, plumbing fixtures, wash down hoses, or other manually or automatically operated valves. An outlet passageway 216 connects outlet port 218 to lower valve chamber 206.

Lower portion 205 of valve body 202 also has a second outlet port 222 which is coupled to a drain (not shown). A second outlet passageway 220 connects outlet port 222 to a downstream end 223 of a length of collapsible tubing 224. An upstream end 225 of collapsible tubing 224 opens into lower valve chamber 206.

A second length of collapsible tubing 226 has a downstream end 227 which is received and held in plate 208 and opens into lower valve chamber 206. Collapsable tubing 226 extends upwardly from plate 208 into upper valve chamber 204 and has an upstream end 229 which opens into upper valve chamber 204.

Valve 200 also has a shaft 234. Shaft 234 extends downwardly through the center of valve body 202 from above cover 228 through upper valve chamber 204 and into lower valve chamber 206. An O-ring 236 provides a seal between shaft 234 and cover 228. An O-ring 238 provides a seal between shaft 234 and plate 208.

Shaft 234 has at its lower end a first closure member 240 mounted thereon adjacent collapsible tubing 224. Illustratively, first closure member 240 is a rod which extends axially along an outer surface of shaft 234. A first closure stop 242 is mounted in lower valve chamber 206 adjacent collapsible tubing 224 on the opposite side of collapsible tubing 224 from first closure member 240. Shaft 234 rotates to move first closure member 240 against and away from first closure stop 242 to selectively collapse and uncollapse collapsible tubing 224 as will be discussed in more detail below.

Shaft 234 also has a second closure member 244 mounted thereon between cover 228 and plate 208. Illustratively, first closure member 244 is a finger which extends radially from shaft 234 adjacent one side of collapsible tubing 226. A second closure stop 246 is mounted in upper valve chamber 204 adjacent collapsible tubing 226 on the opposite side of collapsible tubing 226 from second closure member 244. Shaft 234 rotates to move second closure member 244 away from and against second closure stop 246 to selectively uncollapse and collapse collapsible tubing 226 as will be explained in more detail below.

A coil spring 247 is affixed to shaft 234 immediately beneath cover 228 and is also affixed to cover 228. Illustratively, coil spring 247 is affixed to shaft 234 by a pin 250 and is affixed to cover 228 by a pin 248. Coil spring 246 is illustratively a torque wound monel spring. Coil spring 247 rotates shaft 234 to open valve 200 in the event the temperature to which valve 200 is exposed exceeds the predetermined temperature as will be explained in more detail below.

A handle 252 is affixed to the top of shaft 234. Handle 252 has legs 254, 256 which are pivotly coupled to each other at one end thereof at pivot 258. A bolt 260 secures handle 254 to shaft 234.

Leg 254 of handle 252 has a slot 262 transversely extending through a lower portion thereof. Leg 252 has a corresponding slot 263 transversely extending through an upper portion thereof. A lock pin is received in slots 266, 263 of legs 254, 252, respectively. Lock pin 266 is secured in place by retaining wire 267. When in place, lock pin 266 prevents manual operation of valve 200 as will be explained below. A chain 268 is attached at one end to pin 266 and at its other end to a pin 270. Pin 270 is secured to one side of cover 228. Chain 268 prevents lock pin 266 from being lost or stolen when lock pin 266 is removed from slots 262, 263.

Leg 254 also includes a downwardly opening recess 264 for receiving one end of a spring 274. Leg 256 of handle 252 has an upwardly opening recess 265 beneath recess 264 of leg 254 for receiving a second end of spring 274.

Leg 256 of handle 252 has a downwardly opening recess 278 immediately above an upwardly opening recess 276 in cover 228. A positioning lock pin 272 is received in recesses 276, 278 of cover 228 and leg 256, respectively, and extends therebetween. Recess 278 is filled with a temperature sensitive material which melts when the temperature to which valve 200 is exposed reaches or exceeds a predetermined temperature. Alternatively, positioning lock pin 272 could be made from temperature sensitive material which melts when the temperature to which valve 200 is exposed reaches or exceeds a predetermined temperature.

As discussed previously, coil spring 247 rotates shaft 234 to open valve 200 when valve 200 is exposed to a temperature which reaches or exceeds a predetermined temperature. When valve 200 is assembled, spring 247 is secured to shaft 234 and cover 228. Cover 228 is then turned clockwise to set the torque for coil spring 247 and cover 228 is then secured in place. Handle 252 is then assembled to shaft 234. At this time, valve 200 will be closed as shown in FIG. 6. Positioning lock pin 272 is received in recesses 276, 278 of cover 228 and leg 256, respectively, and prevents movement of handle 252 which in turn prevents shaft 234 from rotating. Spring 274 urges legs 254, 256 of handle 252 apart to maintain positioning lock pin 272 in recesses 276, 278 of cover 228 and leg 256, respectively. Positioning lock pin 272 and recesses 276, 278 comprise a temperature sensitive link which mechanically couples the shaft 234 to the valve body 202 to prevent shaft 234 from rotating when the temperature to which valve 200 is exposed is less than the predetermined temperature and decouples the shaft 234 from the valve body 202 when the temperature to which valve 200 is exposed reaches or exceeds the predetermined temperature, thus permitting shaft 234 to rotate and open valve 200.

In the closed position of valve 200 as shown in FIG. 6, second closure member or finger 244 is forced against second closure stop 246 pinching collapsible tubing 226 shut, thus collapsing collapsible tubing 226. When collapsible tubing 226 is pinched shut, the pressure in upper valve chamber 204 acts on the portion of collapsible tubing 226 downstream of finger 244 to collapse collapsible tubing 226 in the same manner as was discussed with collapsible tubing 30 and 32 of FIG. 1. Also, when shaft 234 is in the position shown in FIG. 6, first closure member 240 will have been rotated away from first closure stop 242 so that collapsible tubing 224 is uncollapsed. Lower valve chamber 206 will thus be coupled through collapsible tubing 224, outlet passage 220 and outlet port 222 to a drain (not shown), thus relieving the pressure in lower valve chamber 206. This in turn relieves pressure on the downstream side of collapsible tubing 226 and also relieves the pressure to the downstream devices to which outlet port 218 is coupled.

Valve 200 can be opened manually or will open automatically when it is exposed to a temperature which reaches or exceeds the predetermined temperature. To open valve 200 manually, leg 256 of handle 252 is moved upwardly toward leg 254 of handle 252. This moves recess 278 of leg 256 up off of positioning lock pin 272 so that handle 252 can be rotated to open valve 200. Lock pin 266 when in place prevents manual operation of valve 200 by preventing leg 256 of handle 252 from being moved upwardly. Illustratively, cover 228 has two recesses 276 located so that positioning lock pin 272 can be moved between them to permit valve 200 to be locked by lock pin 266 in either the open or closed position.

Illustratively, valve 200 is opened by rotating handle 252 counterclockwise. When handle 252 is rotated counterclockwise, shaft 234 rotates counterclockwise. This forces first closure member 240 against first closure stop 242, pinching collapsible tubing 224 shut. It also rotates second closure member 244 away from second closure stop 246 which uncollapses collapsible tubing 226. When this occurs, pressurized fluid flows from upper valve chamber 204 through collapsible tubing 226 into lower valve chamber 206 and out through outlet passageway 216 and outlet port 218 to the downstream devices (not shown). Since first closure member 240 has been forced against first closure stop 242 to pinch collapsible tubing 224 shut, collapsible tubing 224 will be collapsed by the pressure in lower valve chamber 206 in the same manner as discussed with collapsible tubing 30 and 32 of FIG. 1.

When the temperature to which valve 200 is exposed reaches or exceeds the predetermined temperature, valve 200 will open automatically. As shown in FIG. 6, valve 200 is in the closed position wherein first closure member 240 has been rotated away from first closure stop 242 and closure member or finger 244 has been forced against second closure stop 246 so that collapsible tubing 226 is collapsed and collapsible tubing 224 is uncollapsed. When the temperature to which valve 200 is exposed reaches or exceeds the predetermined temperature, illustratively 400° Fahrenheit, the temperature sensitive material in recess 278 in which positioning lock pin 272 is received melts. This frees handle 252 for rotation, thus freeing shaft 234 for rotation. Coil spring 247 will then rotate shaft 234 and handle 252 counterclockwise. This opens valve 200 in the same manner as if valve 200 was opened manually as discussed above.

FIG. 7 shows a modification to the valve of FIG. 3 to incorporate the improved arrangement of FIG. 6 for "automatically" opening or shifting the valve when the temperature to which the valve is exposed reaches or exceeds a predetermined temperature. The same reference numerals used in FIGS. 1 and 6 will be used to identify like elements in FIG. 7. Further, only the modifications made to the valve of FIG. 3 to incorporate the improved automatic shifting arrangement will be discussed.

The valve of FIG. 7 is illustratively a three position valve. It has a first open position where outlet 64 is closed and outlet 66 is open, a neutral position where both outlets 64, 66 are closed, and a second open position where outlet 64 is open and outlet 66 is closed. As shown in FIG. 7, valve 52 is in its first open position. Camming device 98 has actuated closure members 90, 92 to collapse flexible tubing length 76 and has actuated closure members 94, 96 to allow flexible tubing length 78 to uncollapse.

Handle 106 is rotated, illustratively counterclockwise sixty degrees, to shift valve 52 to its neutral position. Camming device 98 will then have actuated closure members 90, 92, 94, 96 to collapse both flexible tubing lengths 76, 78.

Handle 106 is rotated an additional sixty degrees counterclockwise to shift valve 52 to its second open position. Camming device 98 will then have actuated closure members 90, 92 to uncollapse flexible tubing length 76 and will have actuated closure members 94, 96 to collapse flexible tubing length 78.

Valve 52 is provided with a coil spring 247 affixed to shaft 104 immediately beneath cover 84 which is also affixed to cover 84. Illustratively, coil spring 247 is affixed to shaft 104 by a pin 250 and is affixed to cover 228 by a pin 248.

Handle 106 also has upper and lower legs 254, 256, respectively. Positioning lock pin 272 is received in recesses 272, 278 of cover 84 and leg 256, respectively, and extends therebetween. Recess 278 is filled with a temperature sensitive material which melts when the temperature to which valve 52 is exposed reaches or exceeds a predetermined temperature. Alternatively, positioning lock pin 272 could be made from a temperature sensitive material.

Coil spring 247 "automatically" shifts valve 52 to its second open position when the temperature to which valve 52 is exposed reaches or exceeds the predetermined level. As discussed previously with respect to FIG. 6, when the predetermined temperature is reached, the temperature sensitive material in recess 278 melts. This releases positioning lock pin 272 freeing handle 106 for rotation. Coil spring 247 then rotates shaft 104 counterclockwise to shift valve 52 to its second open position.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A flow control device comprising a valve having a valve body, the valve body having first and second valve chambers, collapsible tubing coupling the first and second valve chambers, means for selectively collapsing and uncollapsing the flexible tubing to close and open the valve including a shaft mounted in the valve body for rotation therein, the shaft having means for pinching the collapsible tubing shut when the shaft is in a first position to cause the collapsible tubing to collapse, biasing means for rotating the shaft from its first position to a second position to move the shaft's means for pinching the collapsible tubing shut out of pinching engagement with the collapsible tubing to permit the collapsible tubing to uncollapse, a temperature sensitive link mechanically coupling the shaft to the valve body to prevent the shaft from rotating when the temperature to which the valve is exposed is less than a predetermined temperature, the link decoupling the shaft and valve when the temperature to which the valve is exposed reaches or exceeds the predetermined temperature which permits the shaft to be rotated by the biasing means to its second position to open the valve by permitting the collapsible tubing to uncollapse.

2. The flow control device of claim 1 wherein the shaft's means for pinching the collapsible tubing shut includes a finger attached to the shaft and extending radially therefrom, the valve further including a stop mounted in the first valve chamber adjacent the collapsible tubing against which the finger pinches the collapsible tubing when the shaft is in its first position.

3. The flow control device of claim 1 and further including a handle attached to the shaft for manually rotating the shaft between its first and second position to manually open and close the valve; the temperature sensitive link including the handle having a recess opening toward the valve body, the valve body having a recess opening toward the handle, and a pin received in the recesses in the handle and valve body to prevent the handle from rotating to prevent the shaft from rotating.

4. The flow control device of claim 3 wherein the handle has first and second legs pivotally coupled at one end, one leg being adjacent the valve body and interposed between the valve body and the other leg, the leg adjacent the valve body having the recess of the handle which receives the pin of the temperature sensitive link, and a spring disposed between the first and second legs of the handle to urge them apart which urges the recess in the leg adjacent the valve body onto and over the pin.

5. The flow control device of claim 3 wherein one of said recesses includes temperature sensitive material for holding said pin in place, the temperature sensitive material melting when the temperature to which it is exposed reaches or exceeds the predetermine temperature thereby releasing the pin to allow the shaft to rotate.

6. The flow control device of claim 3 wherein the pin of the temperature sensitive link is formed from temperature sensitive material, the temperature sensitive material melting when the temperature to which it is exposed reaches or exceeds the predetermined temperature thereby allowing the shaft to rotate.

7. The flow control device of claim 1 wherein the valve has an inlet for coupling to a source of pressurized fluid which opens into the first valve chamber, a first outlet for coupling to a downstream device and opening into the second valve chamber, a second outlet for coupling to a drain, a second collapsible tubing coupled to an inlet end of the second outlet, the second collapsible tubing having an upstream end opening into the second valve chamber, the shaft including second means for collapsing the second collapsible tubing when the shaft is in its second position wherein the valve is open and for permitting the second collapsible tubing to uncollapse when the shaft is in its first position wherein the valve is closed.

8. The flow control device of claim 7 wherein the shaft's means for collapsing the collapsible tubing which couples the first valve chamber to the second valve chamber is mounted on the shaft such that it is disposed within the first valve chamber.

9. The flow control device of claim 1 wherein the biasing means comprises a coil spring coupled to the shaft and to the valve.

10. A flow control device, comprising a valve having a valve body, the valve body having a plate mounted therein which divides the valve body into first and second portions which define first and second valve chambers, respectively, first collapsible tubing having an upstream end and a downstream end, the downstream end of the first collapsible tubing received in a hole in the plate and opening to the second valve chamber, the first collapsible tubing extending from the plate into the first valve chamber, an upstream end of the first collapsible tubing opening into the first valve chamber, the valve having an inlet for coupling to a source of pressurized fluid and which opens into the first valve chamber to provide pressurized fluid to the first valve chamber from the source of pressurized fluid, the valve having an outlet for coupling to downstream devices, a shaft extending into the valve body and through at least portions of the first and second valve chamber, a portion of the shaft which extends through the first valve chamber having a member mounted thereon for pinching the first collapsible tubing shut when the shaft is in a first position which causes a decrease in the downstream pressure in the first collapsible tubing so that the pressure of the fluid in the first chamber collapses the first collapsible tubing to shut the valve off, a spring coupled to the shaft and to the valve body to rotate the shaft from its first position to a second position which moves the member out of pinching engagement with the first collapsible tubing to permit the first collapsible tubing to uncollapse to open the valve, a fusible link coupled to the shaft and to the valve body for preventing the shaft from rotating from its first position, the fusible link melting when the temperature to which the valve is exposed reaches or exceeds a predetermined temperature which releases the shaft for rotation wherein the spring rotates the shaft from its first position to its second position to open the valve.

11. The flow control device of claim 10 and further including a handle coupled to the shaft to permit the shaft to be manually rotated between its first and second position to permit the valve to be manually opened and closed.

12. The flow control device of claim 11 wherein the handle has a recess opening toward the valve body and the valve body having a recess opening toward the handle, the valve further including a pin received in the recesses for preventing the handle from rotating to prevent the shaft from rotating.

13. The flow control device of claim 12 wherein the fusible link includes one of said recesses having temperature sensitive material therein for securing the pin in place, the temperature sensitive material melting when the temperature to which it is exposed reaches or exceeds the predetermined temperature thereby releasing the pin to allow the shaft to rotate.

14. The flow control device of claim 12 wherein the fusible link comprises the pin being formed from temperature sensitive material which melts when exposed to a temperature which reaches or exceeds the predetermined temperature to allow the shaft to rotate.

15. The flow control device of claim 10 wherein the fusible link is coupled to the shaft by being coupled to the handle and is coupled to the valve by being coupled to the valve body.

16. The flow control device of claim 10 wherein the second valve portion has a second outlet having an inlet end coupled to a downstream end of second collapsible tubing and an outlet port for coupling to a drain, the second flexible tubing having an upstream end opening into the second valve chamber, the shaft having mounted on a portion thereof which extends through the second valve chamber a second member for pinching the second collapsible tubing shut when the shaft is in its second position which decreases the downstream pressure in the second collapsible tubing wherein the pressure of the fluid in the second valve chamber collapses the second collapsible tubing, the second member being moved out of pinching engagement with the second collapsible tubing when the shaft is rotated to its first position to permit the second collapsible tubing to open and thereby relieve the fluid pressure in the second valve chamber and thus relieve the fluid pressure to the downstream devices.

17. The flow control device of claim 10 wherein the downstream devices comprise sprinkler heads.

18. The flow control device of claim 10 wherein the spring comprises a coil spring.

19. A flow control device, comprising:
a body having sidewalls which define a fluid-holding chamber;
the chamber having an inlet opening into the chamber and an outlet opening into the chamber;
first collapsible tubing having one end attached to the outlet opening and extending into the chamber;
means for selectively collapsing and uncollapsing the first collapsible tubing to block and unblock flow of fluid from the chamber into the outlet including a shaft mounted in the valve body for rotation therein, the shaft having means for pinching the first collapsible tubing shut when the shaft is in a first position to cause the first collapsible tubing to collapse, biasing means for rotating the shaft from its first position to a second position to move the shaft's means for pinching the first collapsible tubing shut out of pinching engagement with the first collapsible tubing to permit the first collapsible tubing to uncollapse; and
a temperature sensitive link mechanically coupling the shaft to the valve body to prevent the shaft from rotating when the temperature to which the valve is exposed is less than a predetermined value, the link decoupling the shaft and valve when the temperature to which the valve is exposed reaches or exceeds the predetermined value which permits the shaft to be rotated by the biasing means to its second position to open the valve by permitting the first collapsible tubing to uncollapse.

20. The flow control device of claim 19, wherein said valve further includes a second outlet opening into the chamber and second collapsible tubing having one end attached to the outlet opening of the second outlet and opening into the chamber, the means for selectively collapsing the collapsible tubing including means for selectively collapsing and uncollapsing the second collapsible tubing to block and unblock flow of fluid from the chamber into the second outlet, the means for selectively collapsing and uncollapsing the second collapsible tubing comprising the shaft having means for pinching the second collapsible tubing shut when the shaft is in the second position to cause the second collapsible tubing to collapse, the means for pinching the second collapsible tubing shut permitting the second collapsible tubing to uncollapse when the shaft in the first position.

21. The flow control device of claim 20, wherein the shaft has a third position between its first and second positions where its pinching means pinches shut both the first and second collapsible tubings.

22. The flow control device of claim 20, wherein the shaft's pinching means comprise a cam mounted on the shaft, first and second pairs of closure members wherein the closure members of the first and second pairs are oppositely disposed on either side of the first and second collapsible tubings, respectively, at least one of the closure members of each pair of closure members being movably mounted and situated adjacent a camming surface of the cam and cooperating with said cam to collapse its corresponding first and second collapsible tubing when the cam rotates as the shaft rotates.

23. The flow control device of claim 19 wherein the temperature sensitive link includes a fusible link coupled to the shaft and the valve body for preventing the shaft from rotating until it melts, the fusible link melting when exposed to a temperature which reaches or exceeds the predetermined value thereby allowing the shaft to rotate.

24. The flow control device of claim 19 and further including a handle attached to the shaft for manually rotating the shaft between its first and second position to manually open and close the valve, the handle having a recess opening toward the valve body, the valve body having a recess opening toward the handle, and the valve further including a pin received in the recesses in the handle and valve body to prevent the handle from rotating to prevent the shaft from rotating.

25. The flow control device of claim 24 wherein the handle has first and second legs pivotally coupled at one end, one leg being adjacent the valve body and interposed between the valve body and the other leg, the leg adjacent the valve body having the recess of the handle which receives the pin, and a spring disposed between the first and second legs of the handle to urge them apart which urges the recess in the leg adjacent the valve body onto and over the pin.

26. The flow control device of claim 24 wherein the fusible link includes one of said recesses having temperature sensitive material therein which holds the pin in place, the temperature sensitive material melting when the temperature to which it is exposed reaches or exceeds a predetermined value thereby releasing the pin to allow the shaft to rotate.

27. The flow control device of claim 25 wherein the the fusible link includes the pin being formed from temperature sensitive material, the temperature sensitive material melting when the temperature to which it is exposed reaches or exceeds a predetermined value thereby allowing the shaft to rotate.

* * * * *